United States Patent

Shannon et al.

[11] Patent Number: 5,839,739
[45] Date of Patent: Nov. 24, 1998

[54] ERGONOMIC UTILITY CART

[75] Inventors: Lonnie M. Shannon, Colgate; Nancy A. Guss, Milwaukee; Thomas J. Kazmerchek, St. Francis; Kent C. Schlienger, Wauwatosa; Raymond H. Donovan, Hales Corners; Arun Garg, Brown Deer, all of Wis.

[73] Assignee: Lakeside Manufacturing, Inc., Milwaukee, Wis.

[21] Appl. No.: 530,674

[22] Filed: Sep. 19, 1995

Related U.S. Application Data

[63] Continuation-in-part of Ser. No. 22,874, May 13, 1994, Pat. No. Des. 362,528.

[51] Int. Cl.[6] .................................................. B62B 3/00
[52] U.S. Cl. ............................... 280/47.35; D34/21
[58] Field of Search ........................... 280/47.34, 47.35, 280/33.991, 79.11, 33.992, 79.2, 79.3; 16/110 R; 298/2; D34/12, 17, 21, 22, 23; 211/187

[56] References Cited

U.S. PATENT DOCUMENTS

| | | |
|---|---|---|
| D. 203,388 | 1/1966 | Belle et al. . |
| D. 247,169 | 2/1978 | Sheeley et al. . |
| D. 256,446 | 8/1980 | Hultberg . |
| D. 268,620 | 4/1983 | Schreiner . |
| D. 277,561 | 2/1985 | Erfurth . |
| D. 287,178 | 12/1986 | Babb et al. . |
| D. 301,850 | 6/1989 | Clement et al. . |
| D. 309,812 | 8/1990 | Wolters et al. . |
| D. 321,123 | 10/1991 | Simonetti . |
| 2,886,186 | 5/1959 | Hamilton ............................. 280/47.35 |
| 3,971,568 | 7/1976 | Wright ................................ 280/47.35 |
| 4,449,732 | 5/1984 | Surot . |
| 4,690,417 | 9/1987 | Betts et al. . |
| 4,998,023 | 3/1991 | Kitts .................................... 280/47.35 |
| 5,203,578 | 4/1993 | Davidson et al. . |
| 5,203,579 | 4/1993 | Lipschitz . |
| 5,299,816 | 4/1994 | Vom Braucke et al. ............ 280/47.34 |

FOREIGN PATENT DOCUMENTS 3044-581  11/1980  Germany .

*Primary Examiner*—Richard M. Camby
*Attorney, Agent, or Firm*—Reinhart, Boerner, Van Deuren, Norris & Rieselbach, s.c.

[57] ABSTRACT

A portable utility cart having a plurality of shelf members coupled to corner post members. At least one ergonomically designed handle is coupled to a corner post member or the shelf member at an inward and inverse angle to vertical.

9 Claims, 9 Drawing Sheets

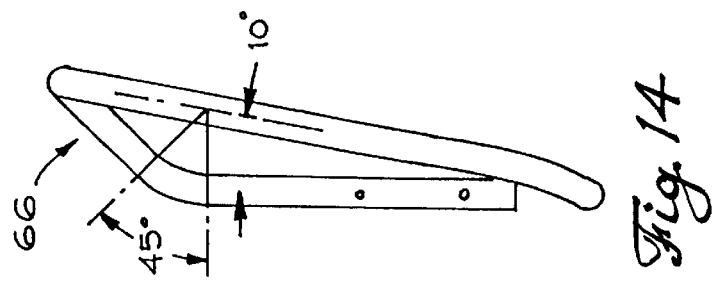
Fig. 14
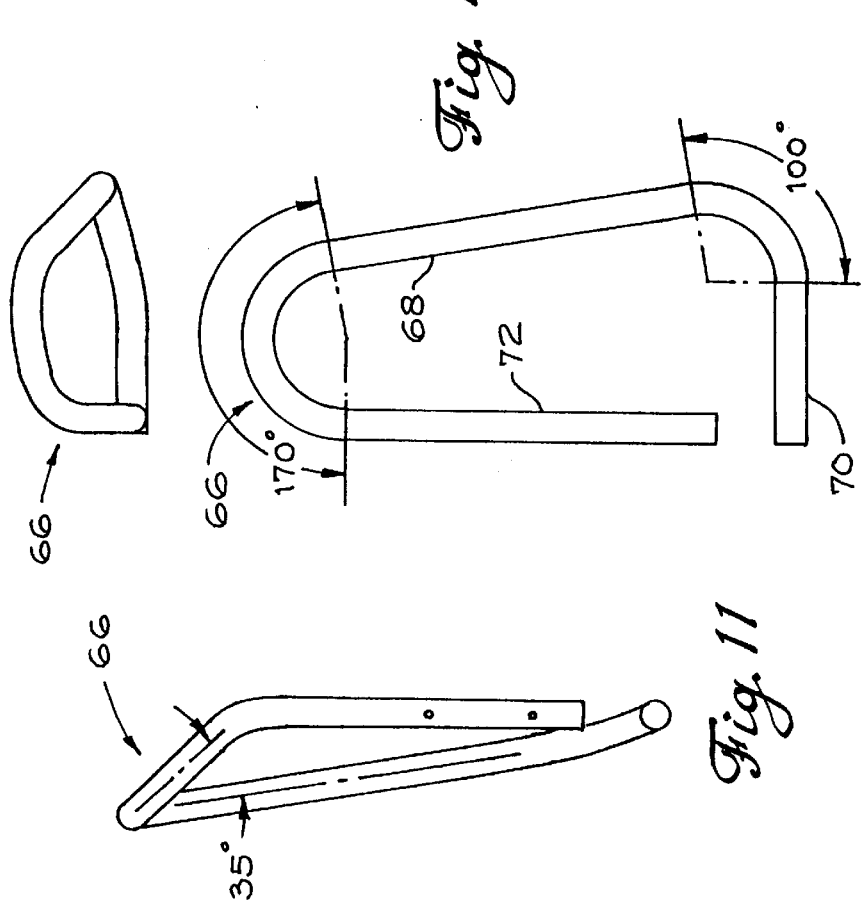
Fig. 12
Fig. 11
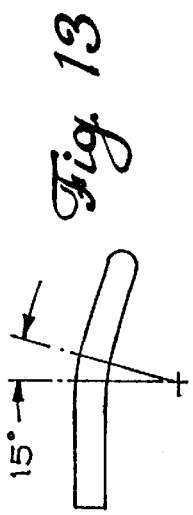
Fig. 13

ERGONOMIC UTILITY CART

This is a continuation-in-part of application Ser. No. 29/022,874 filed on May 13, 1994 now Pat. No. D 362,528.

BACKGROUND OF THE INVENTION

This invention generally relates to portable utility carts and is particularly concerned with utility carts having ergonomically engineered handles and shelf members. A crimping assembly is used for connecting various cart pieces together, making assembly of the cart simple and expedient.

Prior art utility carts have typically been designed primarily for ease of manufacturing rather than ease of use. However, many of these designs are difficult to maneuver, can fatigue the user, and can cause or exacerbate repetitive motion injuries.

According to data released by The Penton Institute, ergonomic-related problems are the single, greatest lost-time injury seen in the workplace today. Musculoskeletal disorders, for example, have tripled in less than a decade, accounting for more than 60% of all recordable illnesses. The cost of lost-time back injuries, especially when surgery is involved, continues to escalate.

Today, employers are expected to be well-versed in the medical as well as financial aspects of their business. Recent law and regulation require an employer to be familiar with cumulative trauma disorders, carpal tunnel syndrome, tendonitis, De Quervain's disease, "trigger finger," and other workplace-generated injuries.

Managers in health care and hospitality industries must become increasingly aware of the workplace ergonomics regulations to be effected by the Occupational Safety and Health Administration (OSHA) in the very near future. Because of OSHA's impact on operations, it is essential that ergonomic factors be addressed at the outset when making facility design decisions and purchasing equipment.

Research by various groups including Lakeside Manufacturing of Milwaukee, Wis., has established that there are two major ergonomic issues relating to the use of utility carts in the workplace: (1) pushing and pulling of carts set up forces which can cause arm, shoulder and back strains; and (2) loading and unloading from carts can exert significant force on the spinal column.

Accordingly, it is an object of the present invention to provide an improved ergonomically designed portable utility cart meeting the concerns described above.

It is a further object of the present invention to provide a novel portable utility cart having handles positioned to be grasped at a variety of heights selected by the user.

It is an additional object of the present invention to provide an improved portable utility cart which is suitable for commercial or personal use and which provides increased maneuverability compared to conventional carts.

It is another object of the present invention to provide a novel portable utility cart having shelves located at heights that eliminate awkward bending.

Other objects, features and advantages of the prevent invention will be readily apparent from the following summary and description of representative embodiments of the invention, taken in conjunction with the accompanying drawings and all reasonable references to be drawn therefrom. It will be understood by those of skill in the art that variations and modifications of one or several of the various embodiments can be effected without departing from the spirit and scope of the novel concepts embodied therein.

DESCRIPTION OF THE DRAWINGS

FIG. 3 is constructed in accordance with the present invention.

FIG. 11 is a detailed front view of the left side handle of the cart shown in FIGS. 7–10.

FIG. 12 is a detailed side elevational view of the handle of the cart shown in FIGS. 7–11.

FIG. 13 is a detailed top view of the handle of the cart shown in FIGS. 7–12.

FIG. 14 is a detailed rear elevational view of the handle of the cart shown in FIGS. 7–13.

SUMMARY OF THE INVENTION

Figure 1:
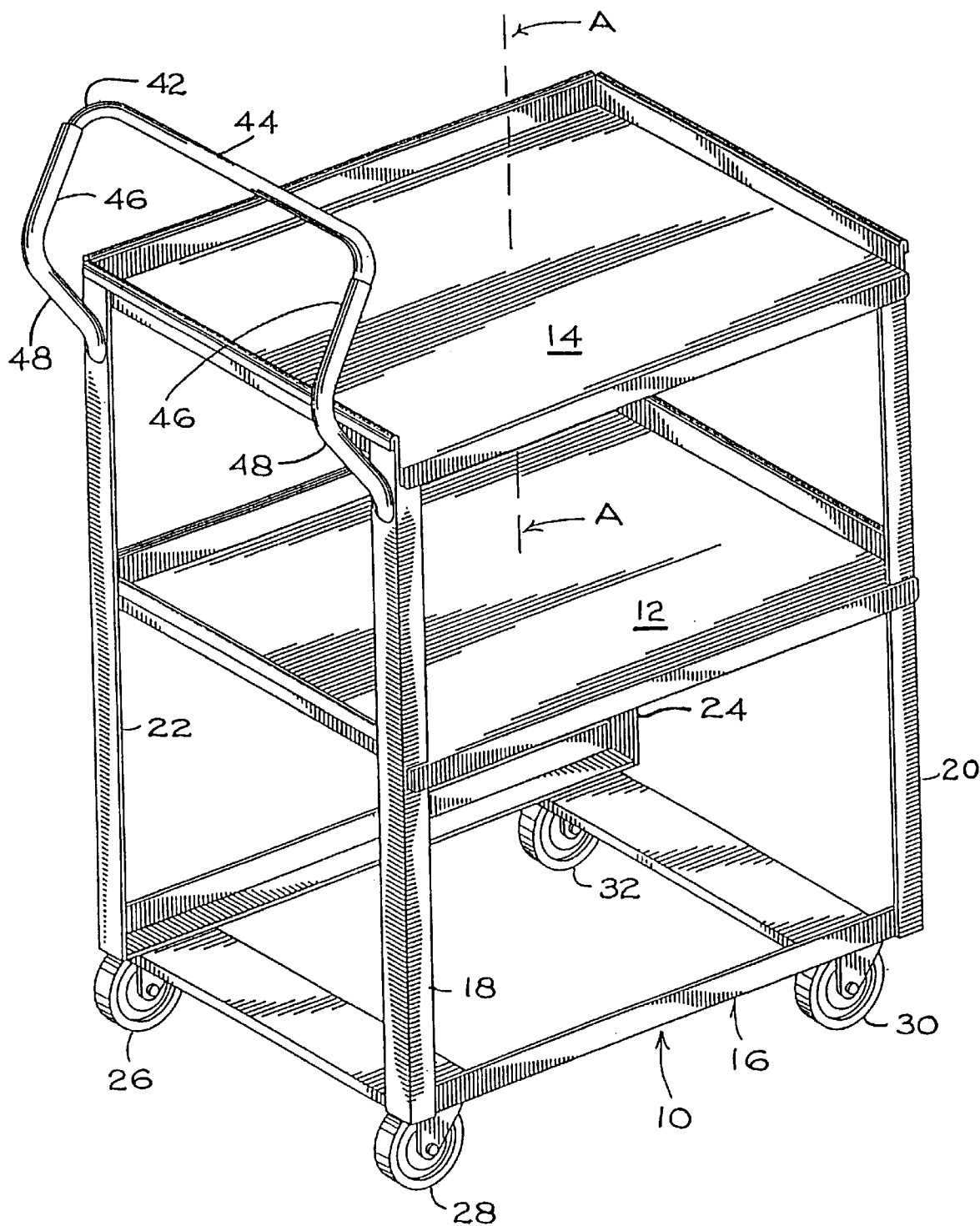
FIG. 1 is a perspective view showing an assembled portable utility cart constructed in accordance with one preferred embodiment of the present invention.

The inventive utility cart disclosed herein can be used to prevent and/or reduce the incidence of repetitive motion, stress or strain injuries of the sort caused by improper lifting, pushing or pulling. As such, the invention overcomes certain well-known problems and deficiencies relating to the designs of prior art utility carts, including those outlined above.

In part, the present invention is a portable utility cart, including (1) a plurality of horizontal shelves aligned uniformly about and at right angles to a vertical shelving access; (2) a plurality of post members arranged between and spacing the shelves, with the post members coupled to the corners of each of the shelves; (3) a handled coupled to at least one of the post members and including at least one grasping portion oriented upwardly toward the shelving access; and (4) a plurality of casters each of which is coupled to a bottom end of a post member. It will be understood by those of skill in the art that a caster can, within the scope of the present invention, comprise multiple components for the purpose of connecting a friction reducing rotation member directly or indirectly to a suitable cart component.

The post members have associated therewith connecting means for attachment of each to one or several of the horizontal shelves. Such connecting means can include any one of the various connecting means known and utilized in the art of metal fabricating, including various bolt configurations, welding, tab/slot configuration and the like. Combinations of such connecting means can also be utilized. Likewise, connector members can be utilized to couple each of the casters to a post member. In highly preferred embodiments, each of the post members is configured to conform to the periphery of a shelf coupled thereto. Where the shelves are substantially square or rectangular, the post members are preferably L-shaped and configured with a rounded corner junction to minimize injuries from incidental contact during loading, unloading and maneuvering. As mentioned above and as is well-known to those skilled in the art of metal fabrication, connector members can include, without limitation, nut/bolt assemblies, tab/slot assemblies and the like used alone, in combination, or in conjunction with various welding techniques.

In preferred embodiments, the inventive utility cart has a handle which is at least partly covered by a cushioning material. In highly preferred embodiments, the cushioning material covers the grasping portion or grasping portions, so as to provide a good gripping surface, absorb vibrations, and provide insulation against temperature extremes. Regardless, in highly preferred embodiments, the handle is arranged and configured to provide a grasping portion extending over a plurality of heights relative to a particular cart user.

In a preferred embodiment, the handle is a single unitary member. The handle can be coupled to a user proximate pair of post members, with a substantially horizontal member joining a first grasping portion to a second grasping portion. In highly preferred embodiments, the first and second grasping portions are upwardly disposed inward one to the other and at least partly covered by a cushioning material.

In part, the present invention is a portable utility cart having a front and an opposed back end, including: (1) a plurality of horizontal rectangular shelving units vertically spaced and aligned uniformly about and at right angles to a central vertical shelving access, such that the lowest shelving unit is elevated about 20 inches with respect to a particular cart user; (2) four post members, each of which is coupled to a corner of each of an aligned shelving unit, such that two of the post members are arranged and defined the front end of the cart and two of the post members are arranged and defined the back end of the cart; (3) a handle having a grasping portion for each hand of a cart user, the handle coupled to the back and post members, and each grasping portion having a vertical dimension of about eight inches oriented upwardly toward the other grasping portion, and substantially toward the vertical shelving access; and (4) four rotation members, each of which is coupled with at least one connector member to a frame linking the lower ends of the post members, each connector member selected from the group consisting of at least one nut and bolt assembly and a crimped tab and slot assembly, whereby two of the rotation members are wheels located substantially below the front end post members and two of the rotation members are swivel casters located substantially below the back end post members. In preferred embodiments, the handle is arranged and configured such that each of the grasping portions thereof is elevated from about 36 inches to about 44 inches with respect to a particular cart user. Likewise, in preferred embodiments, each of the grasping portions is at least partially covered by a cushioning material.

In one highly preferred embodiment, the handle is a single unitary member. Likewise, a highly preferred embodiment of the handle can have a substantially horizontal member continuous with each of the grasping portions, with the handle having a tubular configuration with a diametral dimension of about 0.5 inches to about 1.5 inches. Likewise, in highly preferred embodiments, the handle can be arranged and configured such that each grasping portion is elevated from about 36 inches to about 44 inches, and is at least partially covered by a cushioning material.

In another highly preferred embodiment, the handle includes two unitary members, each of which is coupled to one of the back end post members and having a tubular configuration with a diametral dimension of about 0.5 inches to about 1.5 inches. Likewise, in highly preferred embodiments, the handle is arranged and configured such that each of the grasping portions is elevated from about 36 inches to about 44 inches, with respect to a particular cart user, and each of the grasping portions is at least partially covered by a cushioning material.

As mentioned above, the present invention addresses three principal ergonomic-related issues with respect to the design and manufacture of a utility cart: pushing/pulling the cart, loading/unloading the cart, and appendage injury through use of the cart. With respect to the pulling/pushing issue, the present invention is designed and engineered to keep the required pushing/pulling forces as low as possible. To that effect, larger, hard wheels can be used alone or in conjunction with casters to decrease pushing/pulling forces. As described above, preferred embodiments include relatively large wheels positioned below the front end of the cart in conjunction with swivel casters positioned below the back end of the cart.

In a similar fashion, the handle height can be engineered to decrease the strength required to push and/or pull the cart. As reflected by various embodiments of the present invention, a preferred handle is arranged and configured to provide a grasping portion over a range of heights, relative to a particular cart user. Ease of use can also be effected by handle orientation with respect to the vertical. Grasping portions oriented slightly away from a particular user and toward a vertical shelving access can relieve various stresses and strains. The same grasping portions further oriented upwardly inward and toward one another exhibit additional benefit.

With respect to loading and unloading, the preferred embodiments of the present invention have a lowest shelf/shelving unit elevated about 20 inches and corresponding to the knee height of a particular cart user. The incidence of lower back stress and more serious injury is reduced by minimizing bending. Likewise, an uppermost shelf, in preferred embodiments, is located about chest height, with respect to an average cart user.

With respect to contact injuries, the present invention is preferably configured to minimize sharp corners, edges and ends. Rounded edges, corners, and the absence of protruding components serve to minimize injury, lessen wear on surrounding physical structures, and generally prolong the useful mechanical life of a particular cart.

Figure 4:
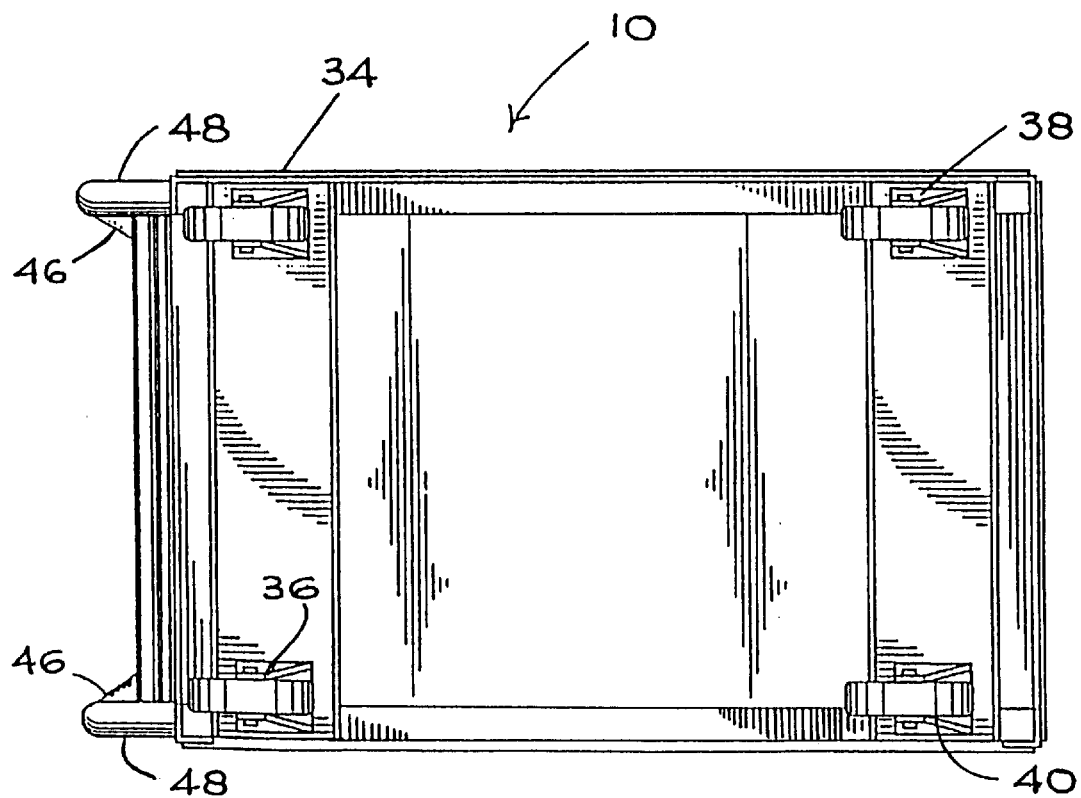
FIG. 4 is a bottom view of the cart shown in FIGS. 1–3.

Referring to the drawings and more particularly to FIG. 1, an embodiment of a portable utility cart in accordance with the present invention is indicated generally at 10. The portable utility cart 10 includes shelves 12 and 14 and frame 16. As shown schematically in FIG. 1, shelves 12 and 14 are uniformly aligned about and at right angles to shelving axis A. Corner post members 18, 20, 22 and 24 are vertically arranged between and coupled to shelf members 12 and 14 at their respective corners. Rotation members, specifically casters 26, 28, 30 and 32, are also shown in FIG. 1, in conjunction with frame 16 and positioned substantially below a respective post member. Connector members 34, 36, 38 and 40 are shown in FIG. 1 and FIG. 4, and are arranged about the underside of frame 16.

Figure 2:
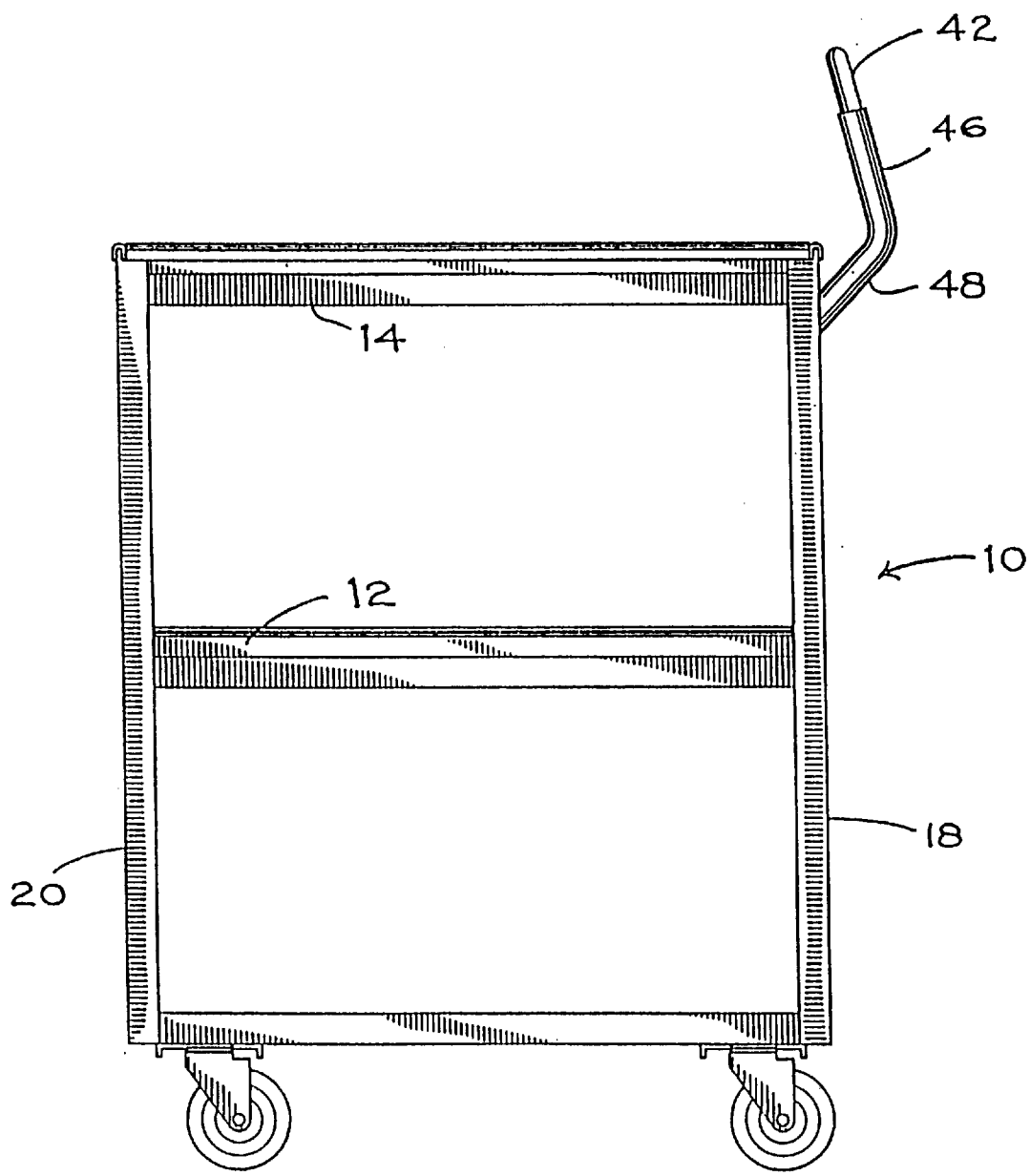
FIG. 2 is a side view of the cart shown in FIG. 1.

Referring back to FIG. 1, unitary handle 42 includes horizontal member 44 connecting grasping portions 46, which can be—as shown in FIG. 1—continuous with connector portions 48 of grasping portions 46. Connector portions 48, as shown in FIG. 1, are coupled to back end post members 18 and 22. As best shown in FIG. 2, handle 42 is arranged and configured such that there is established a minimal clearance of at least about 2.5 inches between handle 42 and post member 18 and/or shelf 14. A clearance distance of this magnitude and greater tends to reduce the incidence of inadvertent scratching, scraping and/or bruising of the hands and digits against cart 10.

Figure 3:
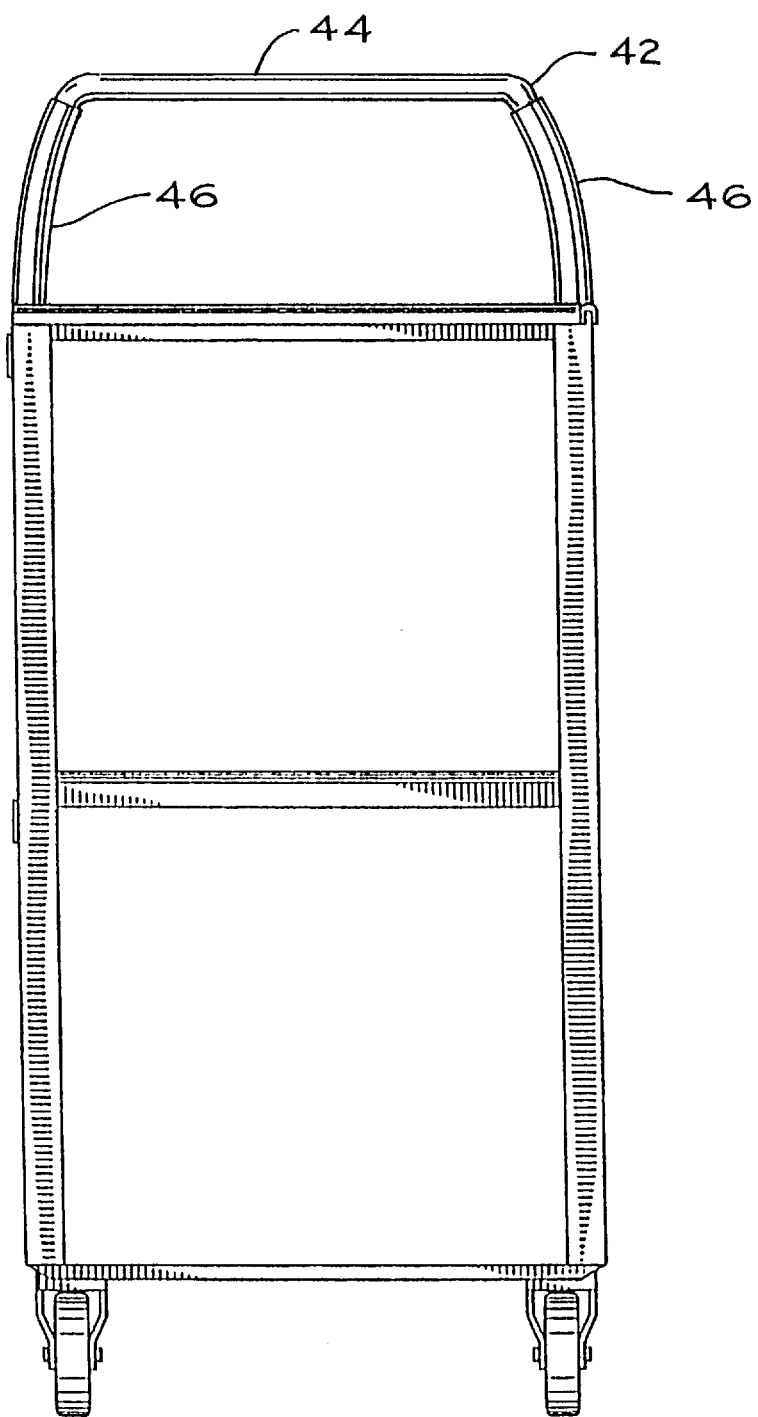
FIG. 3 is a front elevational view of the cart shown in FIGS. 1 and 2.

A highly preferred embodiment of a utility cart of the present invention is shown in FIG. 3. Grasping portions 46 are oriented upwardly toward one another and connected by horizontal member 44. Taken in conjunction with FIG. 1, it is seen that a highly preferred embodiment of the present invention is one which not only has grasping portions 46 directed toward vertical shelving axis A and the front end of cart 10, but also upwardly toward one another. FIG. 4 shows the orientation of handle 42 from a bottom view of cart 10, and illustrates the placement of various casters, wheels, connecting members and the like with respect to handle 42, grasping portions 46 and the peripheral corner post members.

Figure 6:
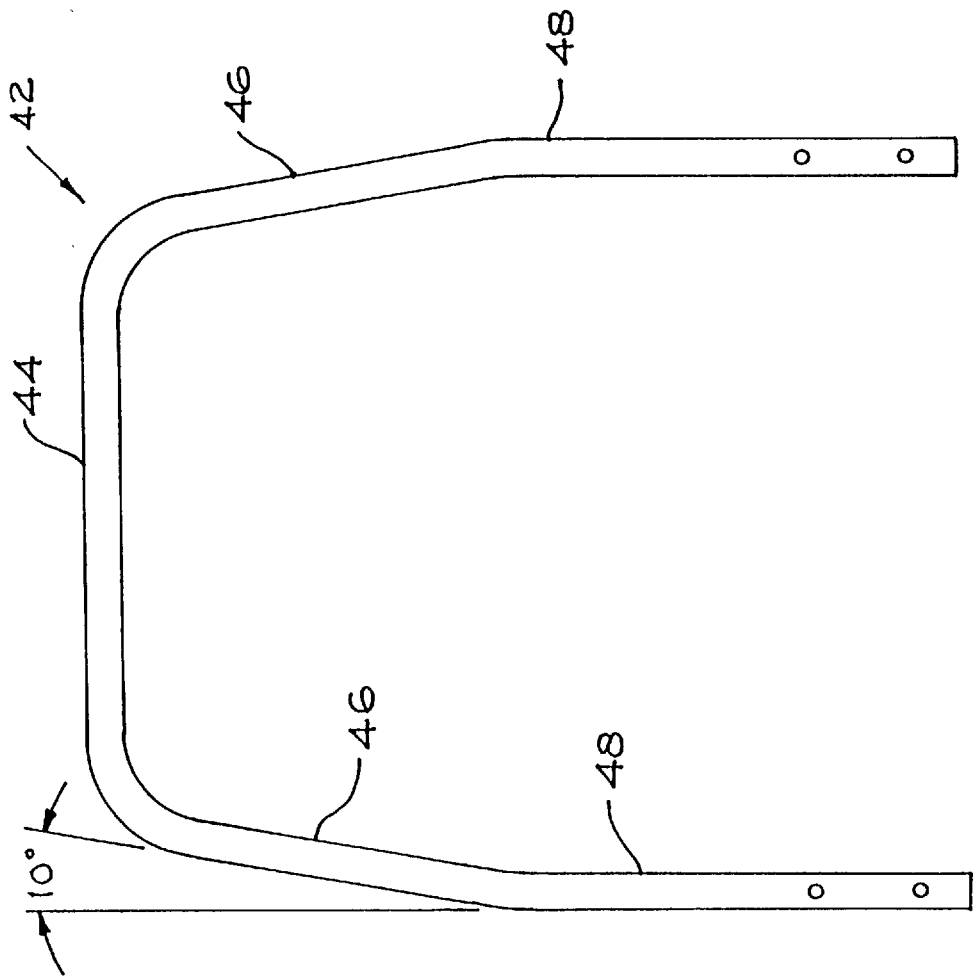
FIG. 6 is a detailed rear elevational view constructed in accordance with the present invention.
Figure 5:
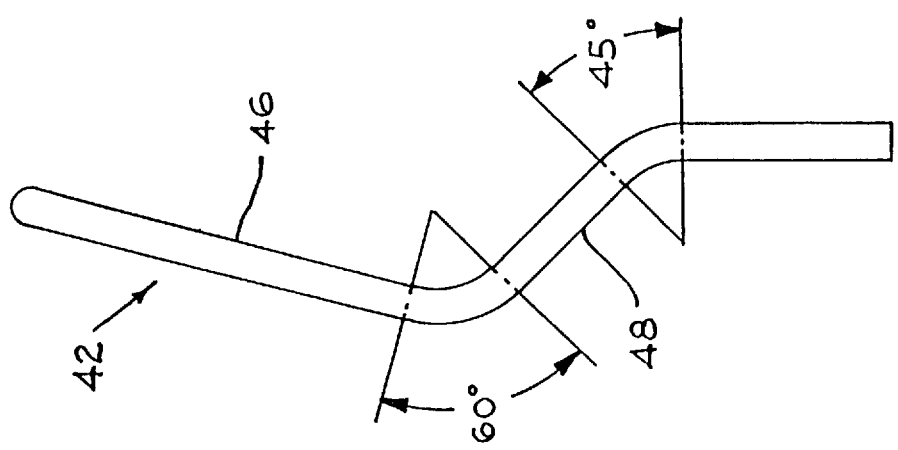
FIG. 5 is a detailed side elevational view of the handle of the carts shown in FIGS. 1–4.

FIGS. 5 and 6 are detailed side and rear elevational views, respectively, of handle 42 of cart 10, as shown in FIGS. 1–4. With reference to the preceding FIGURES, note that grasping portion 46 is shown in both FIG. 5 and FIG. 6 without a cushioning material to absorb vibration and provide a gripping surface. Likewise, a preferred tubular configuration of handle 42 is illustrated more clearly. As shown in FIGS. 5 and 6, as taken in conjunction with FIGS. 1–4, the relative angles between the various components of handle 42, the relative dimensions of each component and their placement with respect to one another act in a unified fashion to minimize ergonomic-related problems.

Figure 7:
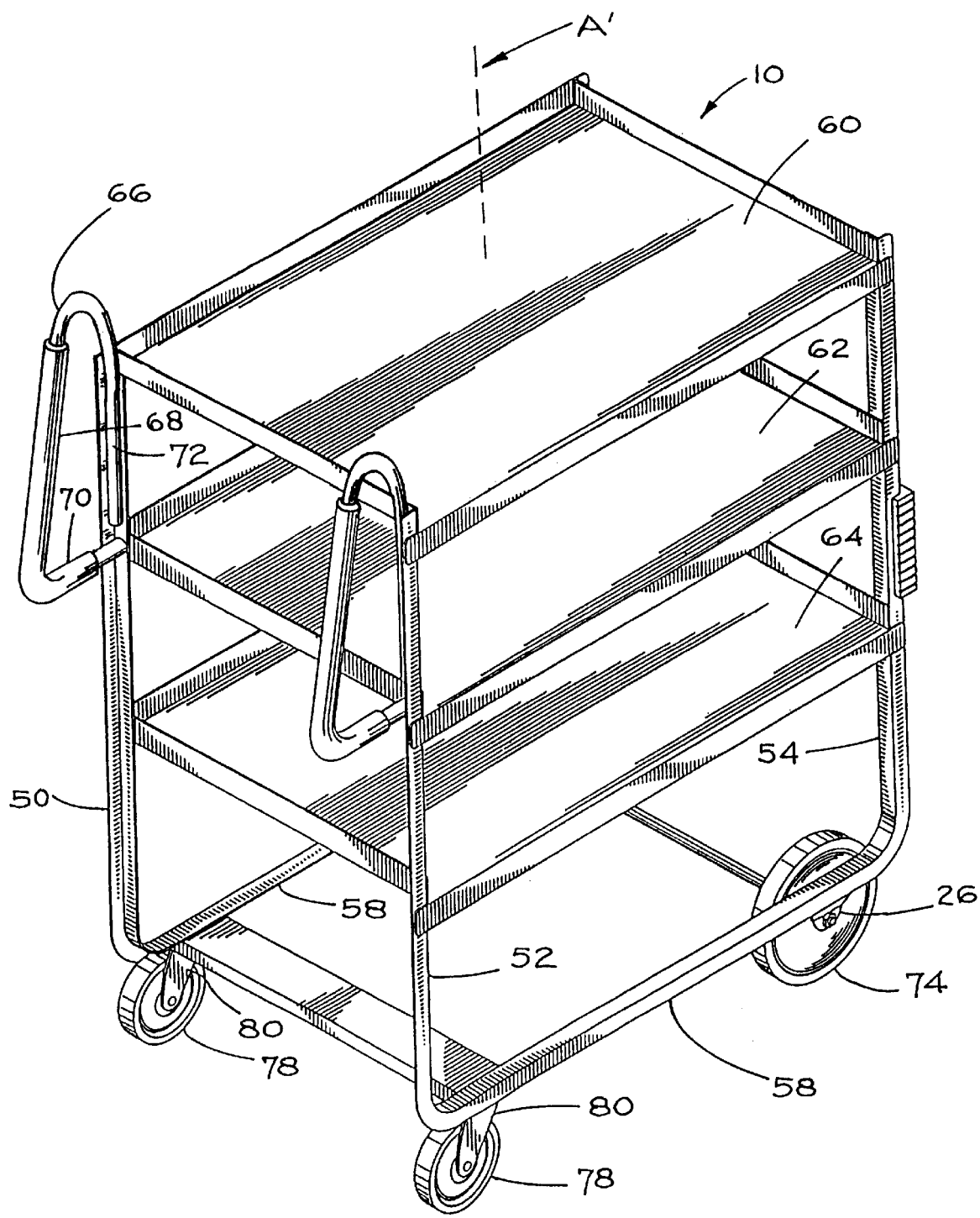
FIG. 7 is a perspective view of a portable utility cart constructed in accordance with another pictured embodiment of the present invention.

Another embodiment of the present invention is as shown in FIG. 7. Post members 50, 52, 54 and 56 (not shown) are coupled to shelving units 60, 62 and 64. Post member pairs 52 and 54 are continuous with frame 58. Likewise, post members 50 and 56 (not shown) are continuous with frame 58. The embodiment of FIG. 7 also illustrates one of several preferred post member configurations: post members 50 and 52 upwardly oriented one to another, thereby directing the orientation of two unitary handle members 66. With such an orientation, grasping portions 68 on each handle 66 are also upwardly oriented one to another. The lower portion 70 of each handle 66 and connector portion 72 of handle 66 couple handle 66 to each of post members 50 and 52. As best shown in FIG. 7, handles 66 are disposed toward the front end of cart 10 and vertical shelving axis A'. This configuration is also evident in FIG. 8.

With reference back to FIG. 7, preferred embodiments of cart 10 have rotation members and specifically wheel members 74 substantially under the front end of cart 10 and the corresponding front end post members. Rotation members and specifically swivel casters 78 are located substantially below back end post members 50 and 52 and are coupled to frame 58 by way of connectors 80. In a similar fashion, connectors 76 couple wheels 74 to frame 58.

Figure 8:
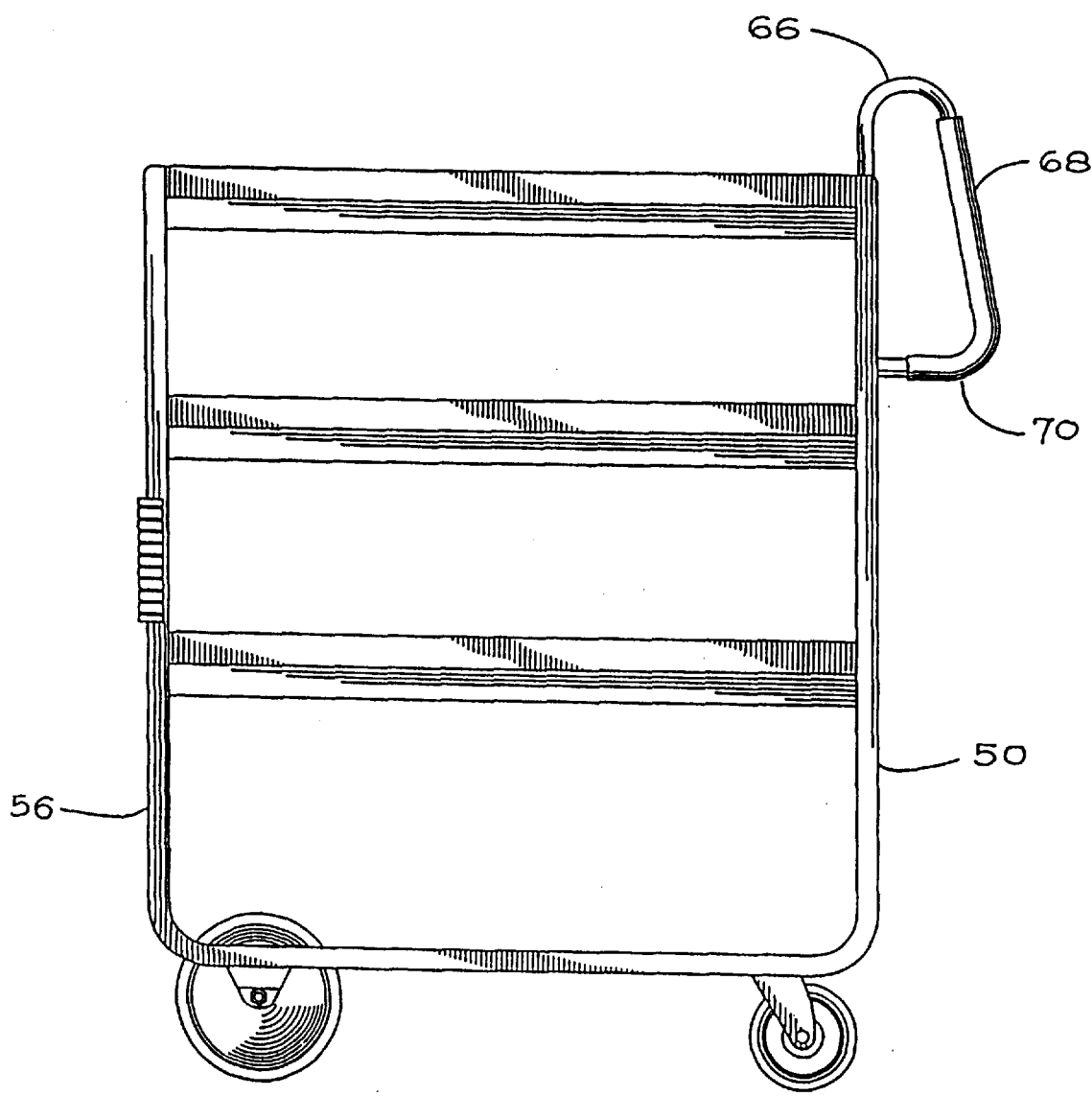
FIG. 8 is a side elevational view of the cart shown in FIG. 7.
Figure 10:
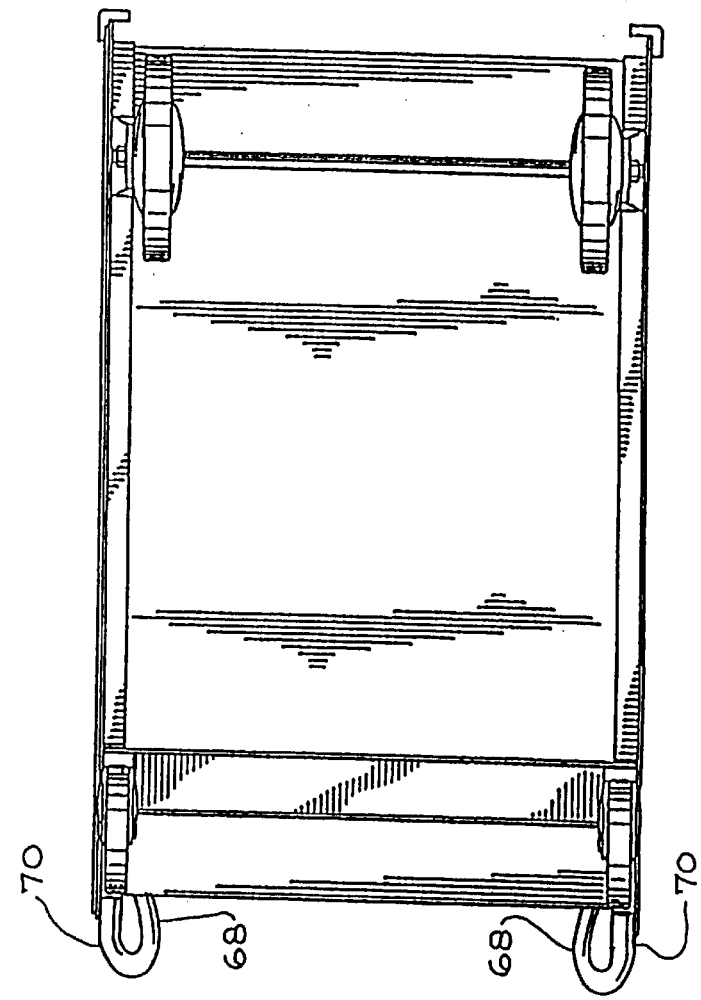
FIG. 10 is a bottom view of the cart shown in FIGS. 7–9.
Figure 9:
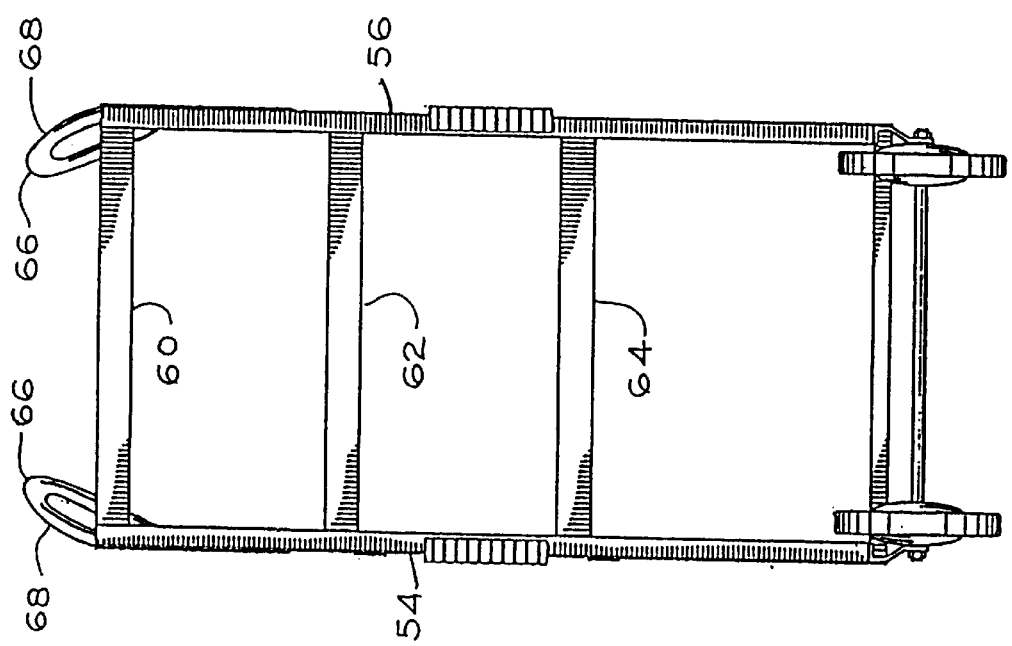
FIG. 9 is a front elevational view of the cart shown in FIGS. 7 and 8.

FIGS. 9 and 10 both show the upwardly inward orientation of handles 66 in conjunction with grasping portions 68 and lower connecting portions 70. FIGS. 11–14 show detailed front, side, top and rear elevational views, respectively, of handles 66. With reference to FIGS. 7 and 8, note that handles 66 can optionally include a cushioning material, as described above.

While the principals of this invention have been described in connection with specific embodiments, it should be understood clearly that these descriptions and FIGURES, along with all reasonable inferences, are made only by way of example and are not intended to limit the scope of the invention, in any manner. Other advantages and features of the invention will become apparent from the following claims, with the scope thereof determined by the reasonable equivalents as understood by those skilled in the art.

What is claimed is:

1. A portable utility cart comprising:
    a plurality of horizontal shelves aligned uniformly about and at right angels to a vertical shelving axis;
    a plurality of post members arranged between and spacing said shelves, said post members coupled to the corners of each of said shelves;
    a handle coupled to a proximate pair of said post members, said handle having a substantially horizontal member joining a first grasping portion to a second grasping portion, each said grasping portion upwardly disposed inward one to another at an angle of about 10° and inclined toward said shelving axis at an angle of about 15°; and
    a plurality of casters each coupled to a bottom end of said post members.

2. The utility cart as defined in claim 1 wherein each said grasping portion has a vertical dimension of about 8 inches, such that a user can contact said grasping portion at a height of about 36 inches to about 44 inches.

3. The utility cart as defined in claim 1, wherein said first and second grasping portions are at least partly covered by a cushioning material.

4. A portable utility cart having a front end and an opposed back end, said cart comprising:
    a plurality of horizontal rectangular shelving units vertically spaced and aligned uniformly about and at right angles to a central vertical shelving axis, such that the lowest shelving unit is elevated about twenty inches;
    four post members, each said post member coupled to a corner of each of said aligned shelving units, two of said post members arranged and defining said front end of said cart and two of said post members arranged and defining said back end of said cart;
    a single unitary handle having a grasping portion for each hand of a cart user, said handle coupled to said back end post members, each grasping portion having a vertical dimension of about 8 inches, oriented upwardly toward the other grasping portion, and substantially toward said vertical shelving axis; and
    four rotation members, each said rotation member coupled with at least one connector member to a frame linking the lower ends of said post members, each said connector member selected from the group consisting of at least one nut and bolt assembly and a crimped tab and slot assembly, whereby two of said rotation members are wheels located substantially below said front end post members and two of said rotation members are swivel casters located substantially below said back end post members.

5. The utility cart of claim 4 wherein said handle is arranged and configured such that each of said grasping portions is elevated from about 36 inches to about 44 inches.

6. The utility cart of claim 5 wherein each of said grasping portions is at least partially covered by a cushioning material.

7. The utility cart of claim 4 wherein said handle has a substantially horizontal member continuous with each of said grasping portions, each said grasping portion upwardly disposed inward one to another at an angle of about 10° and inclined toward said shelving axis at an angle of about 15°.

8. The utility cart of claim 7 wherein said handle is arranged and configured such that each of said grasping portions is elevated from about 36 inches to about 44 inches.

9. The utility cart of claim 8 wherein each of said grasping portions is at least partially covered by a cushioning material.

* * * * *